UNITED STATES PATENT OFFICE.

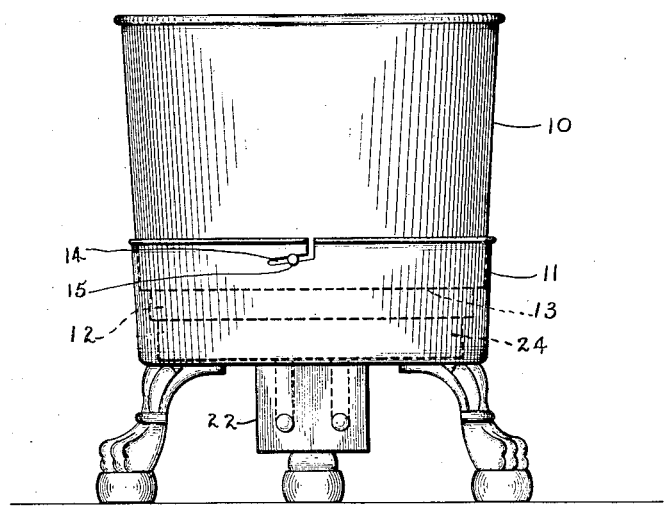
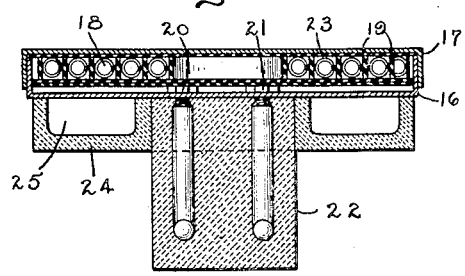
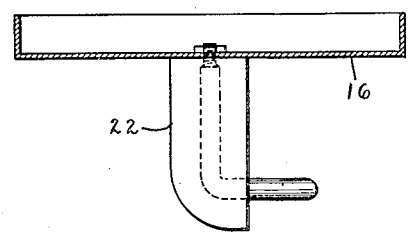
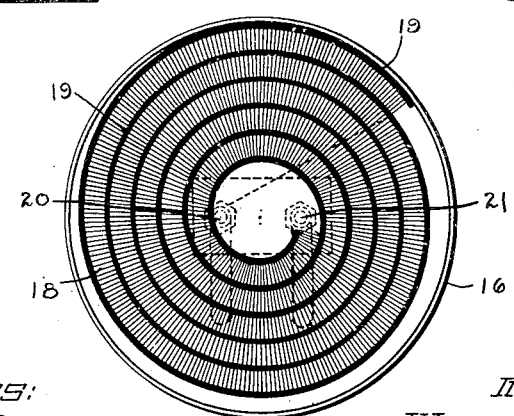

WILLIAM S. ANDREWS, OF SCHENECTADY, NEW YORK, ASSIGNOR TO GENERAL ELECTRIC COMPANY, A CORPORATION OF NEW YORK.

ELECTRIC HEATER.

No. 910,479.   Specification of Letters Patent.   Patented Jan. 19, 1909.

Application filed January 15, 1908. Serial No. 410,920.

*To all whom it may concern:*

Be it known that I, WILLIAM S. ANDREWS, a citizen of the United States, residing at Schenectady, county of Schenectady, State of New York, have invented certain new and useful Improvements in Electric Heaters, of which the following is a specification.

This invention relates to electric heating devices and has for its object the provision of a device of this character which is simple and durable in construction and efficient and reliable in operation, the arrangement being such that the unit may be readily replaced by an unskilled person.

In carrying out my invention I therefore construct a heater in three parts, a body portion, a heating unit adapted to be held in intimate thermal relation therewith, and a receptacle for supporting the heating unit. The heating unit is placed in the receptacle and the latter is then secured to the body portion.

Other objects of my invention will appear in the course of the following specification in which I have shown my invention embodied in concrete form for purposes of illustration.

In the accompanying drawings illustrating my invention, Figure 1 is an elevation of a heating device provided with my improvement; Fig. 2 is a sectional view of the heating unit and terminal; Fig. 3 is a sectional view of the casing for the resistance conductor; and Fig. 4 is a plan view of the unit with the cover removed.

Referring to the drawings, 10 represents the body portion of the heater, which in this case is a fluid container and may be of any desired shape. A receptacle 11 provided with supporting legs is adapted to fit over the bottom of the vessel 10 while a flat heating unit 12 is arranged to be secured between the bottom 13 of the vessel and the bottom of the receptacle. The receptacle and vessel are arranged to be secured together by means of a bayonet joint connection, this connection being merely a tapering slot 14 on opposite sides of the receptacle engaged by correspondingly arranged pins 15.

The heating unit 12 consists of telescoping casings 16 and 17 circular in form and of shallow depth. The heating or resistance conductor 18 is formed in any suitable way, as for instance by a coiled wire laid spirally in the bottom of the casing 16, the turns being separated by an insulating strip 19. The ends of this conductor are secured to the two terminals 20 and 21. These terminals project through the bottom of the casing 16 and are surrounded by or molded into an insulating block 22. The terminals are bent at a right angle within the block so as to project in a plane parallel with the bottom of the casing. The heating element thus becomes a self-contained unit having the resistance conductor secured between the casing 16 and the telescoping cover 17 within a thin sheet of insulating material 23 between the conductor and the cover.

An insulating washer 24 is adapted to fit over the block 22 and engage the bottom casing 16. This washer is preferably chambered as shown at 25 so as to provide an air pocket for heat insulating purposes. This washer separates the heating unit from the bottom of the receptacle and in addition to providing electric insulation reduces the heat radiation through the bottom.

The parts are assembled by first placing the washer 24 in place on the unit as shown in Fig. 2 and then placing the parts in the bottom of the receptacle 11, the latter having its bottom cut away so as to admit the insulating block. The vessel 10 is then placed within the receptacle and is wedged in place by means of the bayonet connections. The unit is thus forced into good heat-conducting relation with the bottom of the vessel so as to make a thoroughly efficient heat-conducting joint. The circuit connections will be made in the usual way by means of a connector fitting over the terminals 20 and 21. If the heating unit is destroyed from any cause, it may be replaced by simply separating the receptacle and vessel and inserting a new unit.

It will be seen that I have provided a very simple and efficient heater, the parts of which are renewable by unskilled hands.

What I regard as a very important feature of my invention is the self-contained unit having an insulating terminal block secured thereto so that the unit as a whole may be easily removed and replaced by unskilled hands.

While I have shown my invention as applied to a specific form of heater, the parts being arranged in a definite way, it should be understood that I do not limit my invention in any of these particulars except in so far as it is limited by the scope of the claims annexed hereto.

What I claim as new and desire to secure by Letters Patent of the United States, is,—

1. An electric heater comprising a receptacle, a container arranged to enter the same, a flat self-contained unit between said parts, and means for locking the receptacle and container together.

2. An electric heating unit comprising a receptacle, a flat self-contained heating unit therein, a container arranged to enter said receptacle and engage the heating unit and means for clamping the receptacle and container together to force the unit into intimate relation with the container.

3. An electric heater comprising a receptacle, a heating unit mounted therein, a container arranged to enter said receptacle, and engage the heating unit, and means for locking said receptacle and container together to force the unit into intimate thermal relation with the container.

4. An electric heater comprising a flat heating unit, a receptacle for supporting the same, a container arranged to enter said receptacle to engage the flat surface of said unit, means for wedging said receptacle and container together, and a connecting terminal secured to said unit and projecting through the bottom of said receptacle.

5. An electric heater comprising a body portion, a self-contained heating unit, a support for said unit, and means for locking the support to the body portion to secure the unit rigidly between said parts.

6. An electric heater comprising a body portion, a flat heating unit therefor, a receptacle for supporting said unit arranged to be wedged to said body portion and hold the flat surface of said unit in intimate thermal relation therewith, and a connecting terminal secured to said unit and projecting through the bottom of said receptacle.

7. An electric heater comprising a body portion, a flat heating unit therefor, a receptacle for supporting said unit in heat-conductive relation to said body portion, and means for locking said body portion and receptacle together.

8. An electric heater comprising a body portion, a flat heating unit therefor, a receptacle for supporting said unit in heat-conductive relation to said body portion, a connecting terminal secured to said unit and projecting through said receptacle, and means for locking the parts together by a rotary movement of the receptacle.

9. An electric heating unit comprising a resistance conductor, telescoping casings inclosing the same, and a connecting plug rigidly secured to one of said casings.

10. An electric heating unit comprising a resistance conductor, telescoping casings inclosing the same, connecting terminals projecting through one of said casings, and an insulating plug molded about said terminals.

11. An electric heating unit comprising a resistance conductor, telescoping casings inclosing the same, detachable connecting terminals projecting centrally through one of said casings, and an insulating plug molded about said terminals.

12. A self-contained heating unit comprising a resistance conductor, telescoping casings inclosing the same, a projecting member rigidly secured to one of said casings having connecting terminals embedded therein and projecting therefrom, and electrical connections between the conductor and said terminals.

13. A self-contained waterproof electric heating unit comprising a resistance conductor protectively inclosed in heat-resisting telescoping casings and having as an integral element a projecting member with connecting terminals embedded therein and projecting therefrom, said terminals projecting inward through the casing to form connections for the conductor.

14. An electric heating unit comprising a flat resistance element, a casing entirely inclosing the same, and a connecting plug secured to said casing.

15. An electric heating unit comprising a flat resistance element, a casing entirely inclosing the same, a connecting plug extending from said casing perpendicular to the plane thereof, and terminals projecting from the plug parallel with the casing.

16. An electric heating unit comprising a resistance conductor distributed over a flat heating surface and inclosed in a metallic casing, and connecting terminals inclosed in a refractory insulating compound projecting from the casing and having exposed ends.

In witness whereof, I have hereunto set my hand this 14th day of January, 1908.

WILLIAM S. ANDREWS.

Witnesses:
BENJAMIN B. HULL,
HELEN ORFORD.